United States Patent
Carter et al.

(10) Patent No.: US 6,822,928 B1
(45) Date of Patent: Nov. 23, 2004

(54) ADAPTIVE SONAR SIGNAL PROCESSING METHOD AND SYSTEM

(75) Inventors: G. Clifford Carter, Waterford, CT (US); Berhane Adal, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/404,654

(22) Filed: Apr. 14, 2003

(51) Int. Cl.[7] ............................................. G01S 15/00
(52) U.S. Cl. ...................... 367/119; 367/901; 367/98; 367/103
(58) Field of Search ........................... 367/901, 103, 367/119, 98

(56) References Cited

U.S. PATENT DOCUMENTS

| | | | | |
|---|---|---|---|---|
| 4,754,282 A | * | 6/1988 | Edelblute et al. | 367/100 |
| 4,956,867 A | * | 9/1990 | Zurek et al. | 381/94.7 |
| 5,448,531 A | * | 9/1995 | Dragoset, Jr. | 702/17 |
| 5,537,368 A | * | 7/1996 | O'Brien et al. | 367/901 |
| 6,009,045 A | * | 12/1999 | Yang et al. | 367/103 |
| 6,313,738 B1 | * | 11/2001 | Wynn | 340/310.03 |

* cited by examiner

Primary Examiner—Daniel Pihulic
(74) Attorney, Agent, or Firm—James M. Kasischke; Michael F. Oglo; Jean-Paul A. Nasser

(57) ABSTRACT

A method and system for processing received sonar signals. The method and system generate bearing data signals based on the received sonar signal. The method and system continuously determine the signal strength of the received sonar signal and also continuously determine the total noise from the received sonar signal in the ocean environment in which the target is located. The method and system provide a sensor gain in response to the determined total noise and the signal strength, and adaptively calculate filter coefficients from the sensor gain and the determined total noise. The method and system also filter the generated bearing data signals using a filter having the calculated filter coefficients.

20 Claims, 2 Drawing Sheets

ADAPTIVE SONAR SIGNAL PROCESSING METHOD AND SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention generally relates to an adaptive passive sonar signal processing method and system.

(2) Description of the Prior Art

Sonar signal processing systems are known in the art. Edelblute et al. U.S. Pat. No. 4,754,282 discloses a data analysis system which uses an Eckart filter that has weights that are updated in accordance with a beam formed output. However, this system does not consider the environmental factors existing in an ocean environment in which a target is located. Zurek et al. U.S. Pat. No. 4,956,867 discloses an adaptive noise canceling apparatus in which adaptive filtering is inhibited in certain circumstances. Dragoset, Jr. U.S. Pat. No. 5,448,531 discloses a method for adaptively creating a filter capable of removing coherent environment noise from a seismic recording. O'Brien, Jr. et al. U.S. Pat. No. 5,537,368 discloses an adaptive statistical filter system updated using data representative of sensed target motion and noise. Wynn U.S. Pat. No. 6,313,738 discloses an adaptive noise cancellation system that adaptively updates the weights of the system's adaptive filters based upon an input signal.

Other prior art systems utilize Eckart filters whose coefficients are obtained using pre-defined spectral levels of the noise and target. However, sonar systems utilizing such Eckart filters typically detect signals and generate bearing, range, speed, aspect and depth information that has less than desirable performance, e.g., reliability and accuracy.

None of these aforementioned patents disclose the technique of using a filter having adaptively calculated coefficients that are based upon the power spectrum of the target and the total noise in the ocean environment in which the target is located.

SUMMARY OF THE INVENTION

It is therefore an object of the present invention to provide a sonar signal processing method and system that utilizes a filter that filters beamformed data based on received sonar signals emanating from a target or source in an ocean environment.

It is another object of the present invention to provide a sonar system that adaptively calculates filter coefficients that depend upon the gain of a sonar sensor array that receives the sonar signals.

Yet another object of the present invention is to provide a sonar system that system that adaptively calculates filter coefficients that depend upon the total noise in the ocean environment in which the target is located.

Thus, the present invention is directed to a method and system for processing received sonar signals. The method and system generate bearing data signals based on the received sonar signal. The method and system continuously determine the signal strength of the received sonar signal and also continuously determine the total noise from the received sonar signal in the ocean environment in which the target is located. The method and system provide a sensor gain in response to the determined total noise and the signal strength, and adaptively calculate filter coefficients from the sensor gain and the determined total noise. The method and system also filter the generated bearing data signals using a filter having the calculated filter coefficients. In one embodiment, an Eckart filter is used to filter the generated bearing data signals.

Additional objects, features, aspects and advantages of the present invention are apparent from the drawings and specification which follow.

BRIEF DESCRIPTION OF THE DRAWINGS

The features of the invention are believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT

In describing the preferred embodiments of the present invention, reference will be made herein to FIGS. 1–2 of the drawings in which like numerals refer to like features of the invention.

Figure 1:
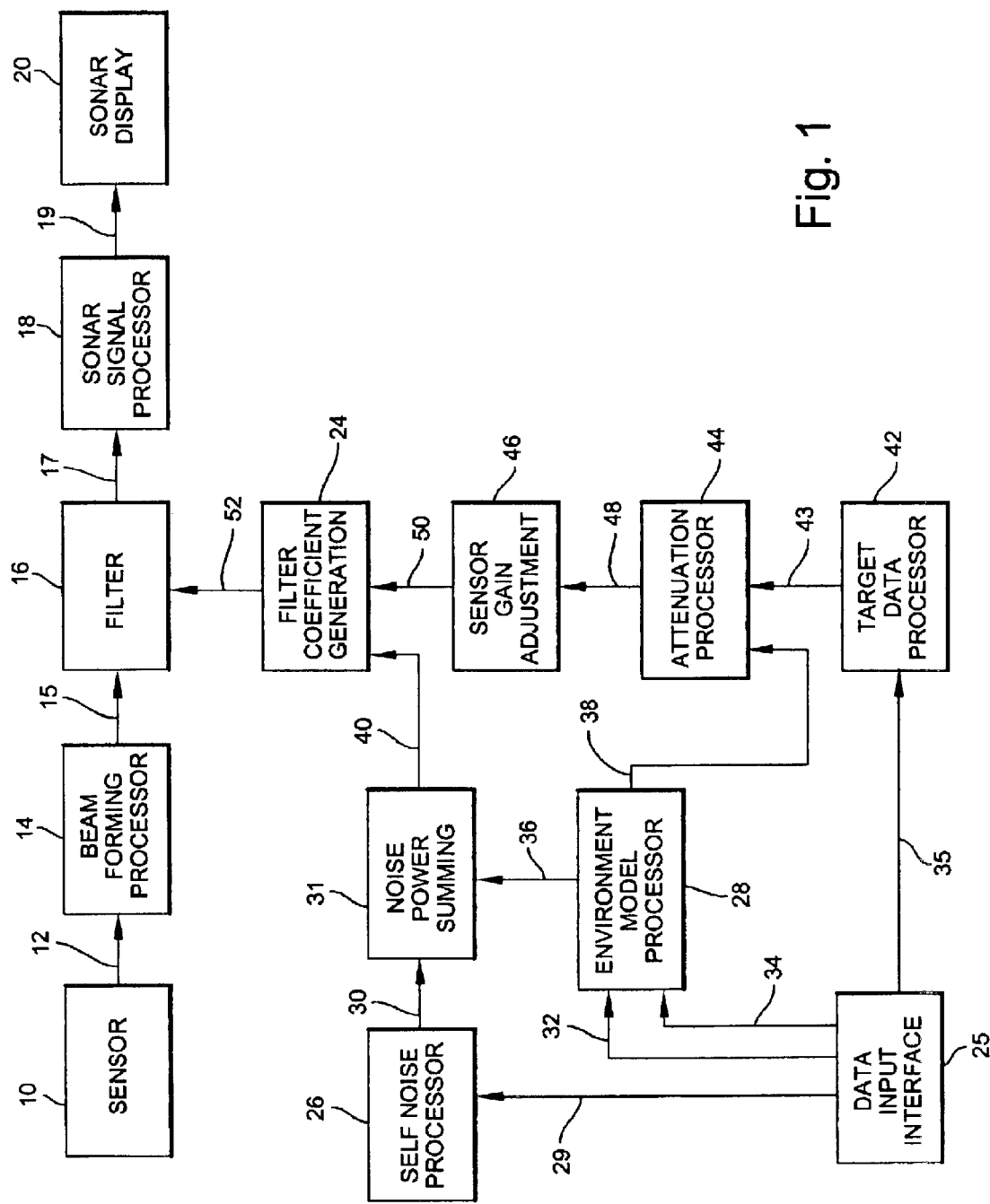
FIG. 1 is a block diagram of the adaptive sonar signal processing system in accordance with one embodiment of the present invention.

Referring to FIG. 1, there is shown a block diagram of the adaptive sonar signal processing system of the present invention. The system shown in FIG. 1 is configured as an open-loop sonar signal processing system. Sensor 10 receives acoustic signals emanating from an object or target in an ocean environment. The received acoustic signals have a signal strength that depends upon several factors that are discussed in the ensuing description. In a preferred embodiment, sensor 10 has a variable gain. In one embodiment, sensor 10 comprises an array of acoustic transducers. Sensor 10 outputs sensed acoustic signals 12 for input into beamforming processor 14. Beamforming processor 14 receives and processes sensed acoustic signals 12 received from sensor 10 and generates selected bearing signal 15 which defines the target bearing. Sensor 10 and beamforming processor 14 are well known in the art and, therefore, are not discussed in detail.

Selected bearing signal 15 is inputted into filter 16. In accordance with the present invention, filter 16 has variable coefficients that are adaptively calculated in response to the gain of sensor 10 and the total noise in the ocean environment in which the target is located. Filter 16 outputs filtered target bearing signal 17. In one embodiment, filter 16 is configured as an Eckart filter. For purposes of example, the ensuing description is in terms of filter 16 being configured as an Eckart filter. However, it is to be understood that an Eckart filter is just one example and that other types of filters can be used as well. The manner in which the filter coefficients of Eckart filter 16 are calculated is described in detail in the ensuing description.

Filtered target bearing signal 17 is inputted into sonar signal processor 18 which processes signal 17 and outputs data signal 19 which defines the bearing, range, depth, speed and aspect of the object. Sonar signal processor 18 is configured to implement various signal processing functions and algorithms such as analog-to-digital conversion, Fourier transforms and analysis, averaging, etc. which are known in the art. Data signal 19 is inputted into display device 20 which displays the bearing, range, depth, speed and aspect of the object in a predetermined format. Data signal 19 can also be provided to other peripheral devices (not shown) such as data storage systems, combat fire control systems, weapon control systems, etc.

Filter coefficient generation module 24 adaptively calculates coefficients for Eckart filter 16 in response to the gain of sensor 10 and the total noise in the ocean environment in which the target is located.

Data input interface 25 allows a user or sonar operator to input data signals that are processed by self noise processor 26 and environment model processor 28. The sonar operator inputs data into data input interface 25 which defines the speed of the ship or vessel which is towing sensor 10. This speed is referred to as "ownship" speed. Data input interface 25 outputs the ownship speed data as data signal 29. Data signal 29 is input into self-noise processor 26. Self-noise processor 26 comprises a library which contains noise data corresponding to particular ships and various speeds of ships. In response to signal 29, self-noise processor 26 outputs data signal 30 which represents the self-noise power spectrum associated with the ship towing sensor 10. Signal 30 is inputted into noise power summing module 31.

The sonar operator also inputs data into data input interface 25 that defines sea state/wind speed, time (i.e. night, day, season, etc.), location (i.e., geographical location), sound velocity profile, sensor depth, and shipping density. This data is outputted from data input interface 25 as a plurality of signals referred to by numeral 32. Signals 32 are provided to environment model processor 28. The sonar operator also uses data input interface 25 to input hypothesized target bearing, range, depth, speed, aspect, and type data corresponding to the target. Data input interface 25 outputs the hypothesized target bearing, range, and depth data as target positioning signal 34 and the hypothesized target speed and aspect data signal 35. Signal 34 is provided to environment model processor 28. Processor 28 processes signals 32 and 34 and outputs ambient noise data signal 36 and a channel propagation loss data signal 38. Ambient noise data signal 36 is inputted into noise power summing module 31 and is summed with the self-noise power defined by data signal 30 to produce a total noise power spectrum signal 40. Signal 40 is inputted into filter coefficient generation module 24.

Target speed and aspect signal 35 is inputted into target data processor 42. Target data processor 42 comprises a library or data base that has information stored therein which is used to process signal 35. Such information includes target signature recognition data that is associated with a plurality of possible target types, speeds and aspects. Target data processor 42 outputs a target power spectrum signal 43 that represents the power spectrum of the target. The channel loss propagation signal 38 and power spectrum signal 43 are provided to attenuation processor 44. Attenuation processor 44 processes these signals 38 and 43 and generates attenuation signal 48 which represents the amount of attenuation sustained by the acoustic signals as they travel from sensor 12 to beamforming processors 14. Attenuation signal 48 is inputted into sensor gain adjustment module 46. Sensor gain adjustment module 46 processes attenuation signal 48 and generates a sensor gain signal 50. The gain of the sensor compensates for channel propagation loss. Sensor gain signal 50 is inputted into filter coefficient generation module 24. Although not shown in FIG. 1, it is to be understood that sensor gain signal 50 is also routed to sensor 10 in order to adjust the sensor gain appropriately.

Filter coefficient generation module 24 adaptively calculates coefficients for the Eckart filter based on the total noise defined by total noise power spectrum signal 40 and sensor gain signal 50 and outputs updated filter coefficient signal 52. Since the data defined by total noise power spectrum signal 40 and sensor gain signal 50 is updated over time as a result of new or updated data being inputted into environment model processor 28 and target data processor 42 via data input interface 25, the coefficients for the Eckart filter are continually and automatically adjusted thereby resulting in significantly more accurate filter coefficients. As a result, sonar signal processor 18 outputs relatively more reliable and accurate data pertaining to target bearing, depth, range, speed, and aspect. Thus, the open-loop feature of the system shown in FIG. 1 exhibits operating characteristics that provide for relatively improved detection functions in comparison to prior art systems. Such improved reliability and accuracy provides for optimum detection of a particular target at a particular range and depth. Furthermore, the overall processing time for producing the target bearing, depth, range, speed and aspect data is decreased. Additionally, the relatively high efficiency and accuracy of the processing function of the adaptive sonar signal processing system of the present invention allows relatively smaller sensor arrays to be utilized thereby reducing costs.

Figure 2:
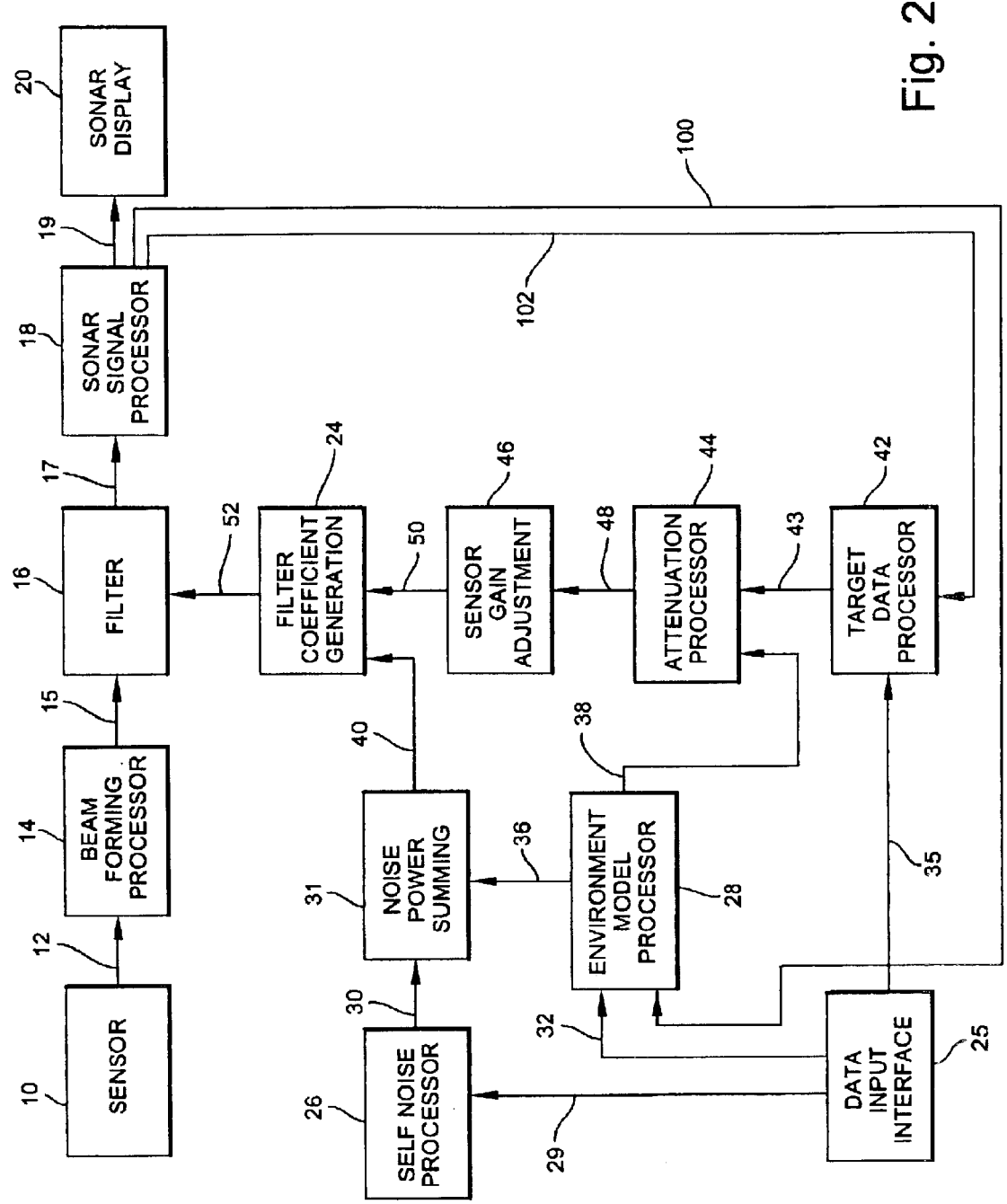
FIG. 2 is a block diagram of the adaptive sonar signal processing system in accordance with another embodiment of the present invention.

Referring to FIG. 2, there is shown another embodiment of the adaptive sonar signal processing system of the present invention. The embodiment shown in FIG. 2 is a closed-loop adaptive sonar signal processing system. In this embodiment, the sonar operator does not input hypothesized target bearing, range and depth into data input interface 25. Thus, target positioning signal 34 is not utilized and therefore is not shown in FIG. 2. Furthermore, the sonar operator does not input hypothesized target speed and aspect data. As a result, target aspect signal 35 only contains target type information. Sonar signal processor 18 outputs two additional signals 100 and 102. A calculated target position signal 100 defines the target bearing, range and depth data and is fed back to environment model processor 28. A calculated target aspect signal 102 represents target speed and aspect data and is fed back to target data processor 42. Thus, environment model processor 28 processes bearing, range and depth data based on received acoustic signals instead of hypothesized data. Similarly, target data processor 42 processes target speed and aspect data based on received acoustic signals instead of hypothesized data. Since the data defined by signals 40 and 50 is constantly being updated as a result of the feedback feature of the system shown in FIG. 2, the coefficients of Eckart filter 16 are constantly and automatically updated. Thus, the closed-loop system of FIG. 2 exhibits operating characteristics that provide for relatively improved tracking functions in comparison to prior art systems.

The signal processors of the adaptive sonar signal processing system of the present invention can be implemented with commercially available signal processing hardware and software. Sensor gain adjustment device 46 as well as sonar display device 20 are known in the art and can be realized by suitable commercially available devices.

The method and system of the present invention can be applied to other types of acoustic signals (i.e. other than underwater acoustic signals) and electromagnetic signals used in communication systems.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

What is claimed is:

1. A method for processing a received sonar signal from a target in an ocean environment comprising:

generating bearing data signals based on the received sonar signal;

continuously determining the signal strength of the received sonar signal;

continuously determining the total noise from the received sonar signal in the ocean environment in which the target is located;

providing a sensor gain in response to the determined total noise and signal strength;

adaptively calculating filter coefficients from the sensor gain and the determined total noise; and filtering the generated bearing data signals using a filter having the calculated filter coefficients.

2. The method according to claim 1 wherein the step of filtering utilizes an Eckart filter.

3. The method according to claim 1 wherein determining the total noise comprises:

determining ownship self noise;

determining ambient noise; and summing the self noise and the ambient noise to produce the total noise.

4. The method according to claim 3 wherein determining the ambient noise comprises:

providing data pertaining to the ocean environment in which the target is located;

providing hypothesized target bearing, range and depth data; and processing the hypothesized target bearing, range and depth data and the data pertaining to the ocean environment to produce the ambient noise.

5. The method according to claim 1 wherein providing a sensor gain comprises determining attenuation sustained by the received sonar signals.

6. The method according to claim 5 wherein determining the attenuation comprises:

determining propagation loss sustained by the received sonar signals;

determining a power spectrum of the received sonar signals; and processing the determined propagation loss and power spectrum to produce the attenuation measurement.

7. The method according to claim 6 wherein determining the propagation loss comprises:

providing data pertaining to the ocean environment in which the target is located;

providing hypothesized target bearing, range and depth data; and processing the hypothesized target bearing, range and depth data and the data pertaining to the ocean environment to produce the propagation loss measurement.

8. The method according to claim 6 wherein determining the power spectrum comprises:

providing hypothesized target speed and aspect data;

providing hypothesized target type data; and processing the hypothesized target speed, aspect and type data to produce the power spectrum measurement.

9. The method according to claim 6 wherein determining the propagation loss comprises:

utilizing filtered bearing data signals to aid in providing data pertaining to the ocean environment in which the target is located; and processing filtered bearing data signals to produce the propagation loss measurement.

10. The method according to claim 9 wherein determining the power spectrum comprises:

providing hypothesized target type data; and processing the target speed and aspect date and the hypothesized target type data to produce the power spectrum measurement.

11. The method according to claim 9 further comprising:

adjusting the sensor gain in response to the attenuation; and adaptively calculating a filter whose coefficients depend on the total noise and attenuation.

12. The method according to claim 1 further comprising processing the filtered bearing data signals to produce target bearing, range, depth, speed and aspect measurements of the target.

13. A system for processing received sonar signals emanating from a target in an ocean environment comprising:

a beamformer processor generating bearing data signals based on the received sonar signals;

noise processing means continuously determining the total noise in the ocean environment in which the target is located;

a sensor gain adjustment device receiving the determined total noise and adjusting the gain of the received sonar signals in response to the determined total noise and signal strength of the received sonar signals;

a filter joined to the beamformer processor to filter the bearing data signals; and a filter coefficient generator adaptively calculating coefficients for said filter which depend on the gain and the determined total noise.

14. The system according to claim 13 further comprising a sonar signal processor joined to the filter to process the filtered bearing data signals to produce target bearing, range, depth, speed and aspect of the target.

15. The system according to claim 13 wherein the filter comprises an Eckart filter.

16. The system according to claim 13 wherein the noise processing means comprises:

means for determining ownship self-noise;

a data input interface to allow input of data pertaining to the ocean environment in which the target is located and to allow input of hypothesized target bearing, range, depth; aspect, speed and type data;

an environment model processor to process the hypothesized target bearing, range and depth data and the data pertaining to the ocean environment to produce the ambient noise measurement; and a summing means to sum the self noise and the ambient noise to produce the total noise.

17. The system according to claim 13 wherein the sensor gain adjustment device comprises:

a propagation loss calculation means;

signal strength analysis means to analyze the received sonar signals and to calculate a power spectrum of the received sonar signals;

an attenuation processor to process the determined propagation loss and the calculated power spectrum to produce the attenuation measurement sustained by the sonar signals; and gain adjustment means to adjust the gain of the received sonar signal in response to the attenuation measurement.

18. The system According to claim 13 wherein the noise processing means comprises:

means for determining ownship self-noise;

a data input interface to allow input of data pertaining to the ocean environment in which the target is located;

a environment model processor to process the target bearing, range and depth data and the data pertaining to the ocean environment to produce the ambient noise measurement; and a summing means to sum the self-noise and the ambient noise to produce the total noise.

19. The system according to claim 13 wherein the sensor gain adjustment device comprises:

a propagation loss calculation means;

signal strength analysis means to analyze the received sonar signals and to calculate a power spectrum of the received sonar signals;

an attenuation processor to process the determined propagation loss and the calculated power spectrum to produce the attenuation measurement sustained by the sonar signals; and gain adjustment means to adjust the gain of the received sonar signal in response to the attenuation measurement.

20. The system according to claim 19 wherein said propagation loss calculation means processes the target bearing, range and depth data and the data pertaining to the ocean environment to produce the determined propagation loss measurement.

* * * * *